(12) United States Patent
Puthalath et al.

(10) Patent No.: US 9,692,849 B2
(45) Date of Patent: *Jun. 27, 2017

(54) METHOD AND NODE ENTITY FOR ENHANCING CONTENT DELIVERY NETWORK

(71) Applicant: TELEFONAKTIEBOLAGET L M ERICSSON (PUBL), Stockholm (SE)

(72) Inventors: Hareesh Puthalath, Solna (SE); Stefan Hellkvist, Stockholm (SE); Lars-Örjan Kling, Södertälje (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 176 days.

This patent is subject to a terminal disclaimer.

(21) Appl. No.: 14/574,688

(22) Filed: Dec. 18, 2014

(65) Prior Publication Data

US 2015/0127766 A1    May 7, 2015

Related U.S. Application Data

(63) Continuation of application No. 13/575,723, filed as application No. PCT/SE2010/050142 on Feb. 5, 2010, now Pat. No. 8,949,533.

(51) Int. Cl.
*H04L 29/08*    (2006.01)
*G06F 9/45*    (2006.01)
*G06F 12/08*    (2016.01)

(52) U.S. Cl.
CPC .......... *H04L 67/2842* (2013.01); *H04L 67/02* (2013.01); *H04L 67/1095* (2013.01);
(Continued)

(58) Field of Classification Search
CPC ....... G06F 8/4441; G06F 8/4442; G06F 12/08
See application file for complete search history.

(56) References Cited

U.S. PATENT DOCUMENTS 6,182,111 B1 *  1/2001  Inohara ............ G06F 17/30067
                                                707/999.01
2003/0135514 A1   7/2003  Patel
(Continued)

FOREIGN PATENT DOCUMENTS

WO    2006/059476 A1    6/2006
WO    2009/068952 A2    6/2009

OTHER PUBLICATIONS

Qingsong Wei, et al., "CDRM: A Cost-Effective Dynamic Replication Management Scheme for Cloud Storage Cluster," Cluster Computing (Cluster), 2010 IEEE International Conference on IEEE, Piscataway, NJ, US, Sep. 20, 2010; pp. 188-196, xp031774311; isbn: 978-1-14244-8373-0.

*Primary Examiner* — Charles Rones
*Assistant Examiner* — Tian-Pong Chang

(57) ABSTRACT

The present invention provides a method and a caching node entity for ensuring at least a predetermined number of a content object to be kept stored in a network, comprising a plurality of cache nodes for storing copies of content objects. The present invention makes use of ranking states values, deletable or non-deletable, which when assigned to copies of content objects are indicating whether a copy is either deletable or non-deletable. At least one copy of each content object is assigned the value non-deletable. The value for a copy of a content object changing from deletable to non-deletable in one cache node of the network, said copy being a candidate for the value non-deletable, if a certain condition is fulfilled.

18 Claims, 6 Drawing Sheets

(52) U.S. Cl.
CPC .......... *G06F 8/4441* (2013.01); *G06F 8/4442* (2013.01); *G06F 12/08* (2013.01)

(56) References Cited

U.S. PATENT DOCUMENTS

| | | |
|---|---|---|
| 2004/0010544 A1 | 1/2004 | Slater |
| 2005/0034150 A1* | 2/2005 | Muraoka ............. H04N 7/1675 725/31 |
| 2006/0259690 A1 | 11/2006 | Vittal |
| 2008/0215663 A1 | 9/2008 | Ushiyama |
| 2009/0113068 A1* | 4/2009 | Fujihira ............. H04L 67/1095 709/231 |
| 2009/0193064 A1* | 7/2009 | Chen ................. G06F 17/30315 |
| 2009/0254661 A1 | 10/2009 | Fullagar |
| 2011/0238927 A1* | 9/2011 | Hatano ................ G06F 12/122 711/145 |

* cited by examiner

| Virtual node 40 (A) | | | |
|---|---|---|---|
| Cache node 18(A) | | | |
| Content in node | Number of requests | Retrieving cost | State of copy |
| Content not in node | Number of requests | Retrieving cost | State of copy |

Fig. 5

METHOD AND NODE ENTITY FOR ENHANCING CONTENT DELIVERY NETWORK

CROSS-REFERENCE TO RELATED APPLICATIONS

This application is a continuation of U.S. application Ser. No. 13/575,723, filed Nov. 5, 2012, which is a 371 of PCT/SE2010/050142 filed Feb. 5, 2010. The contents of U.S. application Ser. No. 13/575,723 and of PCT Application No. PCT/SE2010/050142 are incorporated herein by reference.

TECHNICAL FIELD

The present invention relates generally communications networks, and in particular, a method and a caching node entity for ensuring at least a predetermined number of a content object to be kept stored in a network.

BACKGROUND

One of the fundamental aspects of most computer based systems is that they store and process data. This data can be stored locally or can be retrieved across a network.

A content delivery network or content distribution network (CDN) is a system of computers containing copies of data, placed at various points in a network so as to maximize bandwidth for access to the data from clients throughout the network. To perform this function, content distribution networks have an associated storage system. This system is responsible for the storage of content objects which the CDN is delivering or distributing. This system usually has two components:

Cache component, a distributed system of servers, close to the end users which the system is serving;
The second component is a repository(s) for all the content objects which the CDN is responsible for.

The cache component consists of a set of servers in cache nodes and whose individual storage space is limited. The cache servers store a partial subset of content objects in the content distribution system and serve them to the end users. There is usually a cache decision logic which decides which content objects need to be stored in a particular cache server based on the goals of the CDN system like distribution cost bandwidth, latency, end user satisfaction etc.

A repository component acts as the main storage system for the CDN. All the content objects for which the CDN is responsible for is stored here and copies are moved to the individual cache servers based on the cache decision logic.

An important job of the main repository is to act as the cache for long tail content objects. These are content objects, which are lower in the popularity ranking and hence are long tail content and which are not stored in the system of edge caches but for which there are client requests. Since they are not stored in the caches, the CDN system can still honor the requests for these objects by redirecting the client requests to the main repository. Thus it acts as a Long tail server for the long tail content in CDN system.

Architecturally the easiest way to create this main repository is as a centralized storage system located at the highest levels (or core) of the CDN architecture. This is how most repositories are used in practice as well.

One problem is the single point of failure. Since all the long tail is in one single place, the repository, the CDN has a single point of failure, i.e. if there is an outage in the central server or the link connecting the repository to the rest of the system is disconnected. This will have a profound impact on the CDN system because then the clients will not have access to any long tail content and the CDN cannot replicate effectively.

Further one problem is the bandwidth and connectivity issues. Even though the number of requests for each of the long tail content objects is low, the total number of requests for objects in the long tail is quite high. This translates to a high connectivity and bandwidth requirements at the central repository. Also the fact that content replication also uses the central repository adds on to this bandwidth. These requests have to consistently pass to the core network adding to the bottleneck at the core. Another problem is related to the storage requirements at the central site, wherein the rather long nature (time stored and number of content objects) of the long tail content implies high storage requirements at the main repository.

SUMMARY

One object of the present invention is to allow content objects to be cached in the network in a distributed fashion only, eliminating content object loss and the need for a central repository.

According to an embodiment of the present invention a method for ensuring at least a predetermined number of a content object to be kept stored in a network comprising a plurality of cache nodes for storing copies of content objects. The method makes use of ranking state values deletable or non-deletable, which when assigned to copies of content objects are indicating whether a copy is being deletable or non-deletable. The method is configured to assign at least one copy of each content object the value non-deletable. The method is further adapted to change the value for a copy of a content object from non-deletable to deletable in a cache node of the network, said copy being a candidate for the value deletable, only if a deletable copy of said content object in another cache node is a candidate for the value non-deletable. The value of said copy in the other cache node is also changed, from deletable to non-deletable.

An advantage of this method is that it eliminates content object loss as one copy of a content object is always stored in a cache node.

In another embodiment, the present invention is directed to a caching node entity in a network in a network comprising a plurality of cache nodes for storing copies of content objects. The entity comprises assigning means adapted to assign copies of content objects with a value of a ranking state, wherein the value of the ranking state is indicating whether a copy is being deletable or non-deletable. At least one copy of each content object is assigned with the value non-deletable. The entity is further provided with changing means configured to change the value for a copy of a content object from non-deletable to deletable in a cache node, said copy being a candidate for the value deletable, only if a deletable copy of said content object in another cache node is a candidate for the value non-deletable. The value of said copy in the other cache node is also changed, from deletable to non-deletable by said changing means.

Further embodiments of the present invention is provided by the independent claims.

One advantage with such an entity is that it eliminates the need of a central repository.

The present invention does also provide a very fast, effective and secure method for handling all the millions of content object transfers, e.g. replication, migration and deletion of copies, occurring in every moment in a huge CDN comprising hundred of cache nodes.

Further one advantage over traditional content distribution system using a central repository is that distributed storage in a network is more fault tolerant, and hence there is no single point of failure for both storage and content replication. Yet, a more robust network solution against failures is achieved.

An additional advantage over prior art is that long tail content objects are stored closer to the end user where the cost of distribution is lower.

BRIEF DESCRIPTION OF THE DRAWINGS

The foregoing, and other, objects, features and advantages of the present invention will be more readily understood upon reading the following detailed description in conjunction with the drawings in which:

FIG. 5 is a diagram illustrating an example of what entries may be stored in a virtual node.

DETAILED DESCRIPTION

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced and other embodiments that depart from these specific details. In other instances, detailed descriptions of well known methods, devices, and circuits are omitted so as not to obscure the description of the present invention with unnecessary detail.

Figure 1:
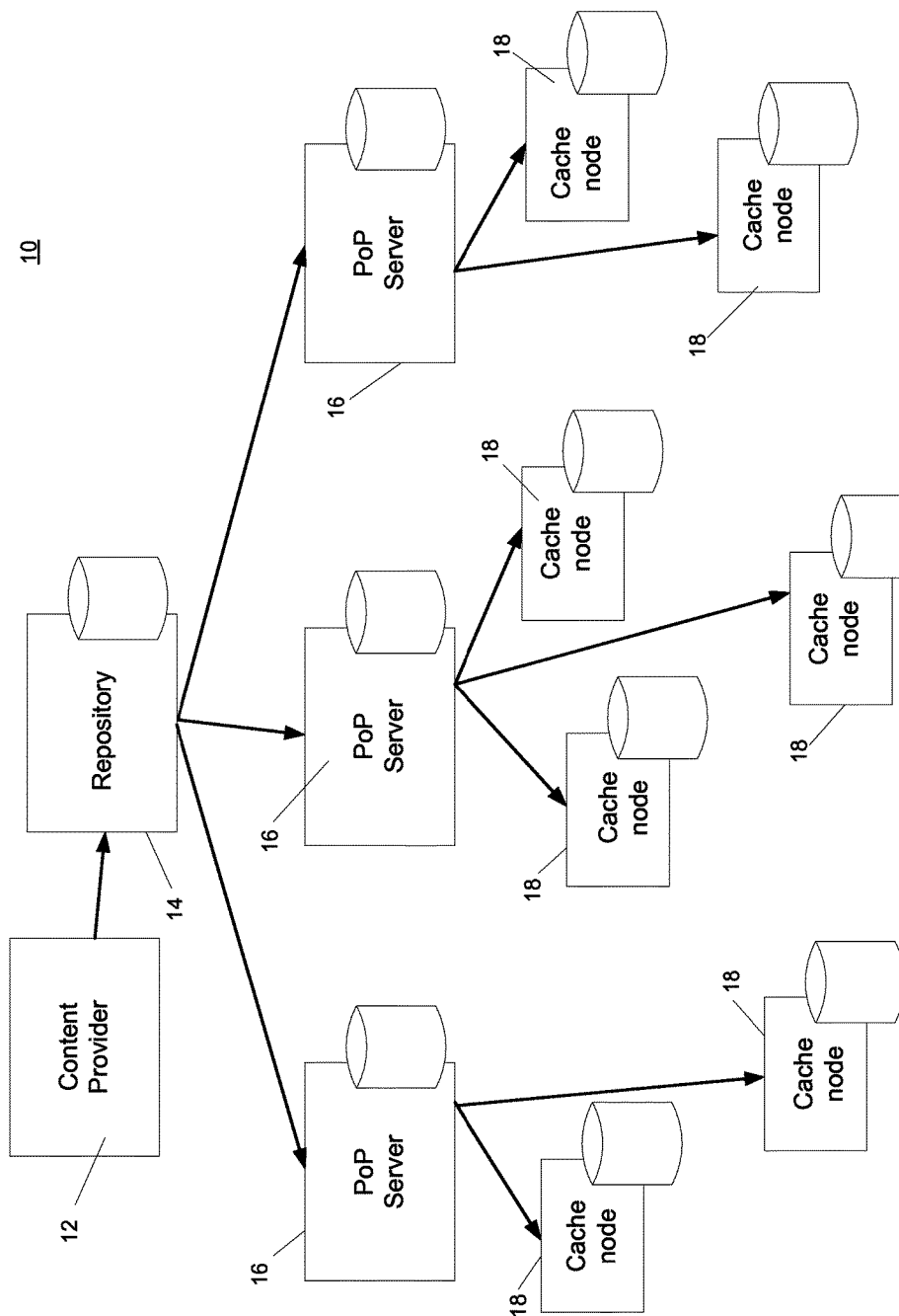
FIG. 1 is block diagram illustration of a traditional content distribution system.

FIG. 1 is a schematic illustration of a traditional content distribution system.

A content delivery network or content distribution network (CDN) 10 is a system of computers containing copies of data, placed at various points in a network so as to maximize bandwidth for access to the data from clients, e.g. end users, throughout the network.

To perform this function, content distribution networks have an associated storage system. This system is responsible for the storage of content objects which the CDN is delivering or distributing. For this purpose, the system comprises a content provider 12, a repository 14, Point of Presence (PoP) servers 16 and edge cage servers 18, hereafter denoted cage nodes 18. Said components are distributed in nodes of a network that connects the different components for providing communication facilities. The cache nodes 18 are a distributed system of servers, close to the end users which the system is serving. The repository(s) 14 is a storage for all the content objects which the CDN 10 is responsible for. The repository 14 acts as the main storage system for the CDN 10. All the content objects for which the CDN is responsible for is stored here and copies are moved to the individual cache servers based on the cache decision logic.

The cache nodes 18 comprise a set of servers whose individual storage space is limited. The servers in the cache nodes 18 store a partial subset of content objects in the content distribution system and serve them to the end users. The cage nodes 18 usually comprise a cache decision logic which decides which content objects need to be stored in a particular cache node 18 based on the goals of the CDN system 10 like distribution cost bandwidth, latency, end user satisfaction etc.

As observable from the above described architecture, most of the solutions use a centralized repository 14 to store their content objects. These objects are then copied or replicated to a set of Point of Presence (PoP) servers 16 which are usually situated at data centers in key locations around the globe. The content is then replicated to a set of cache nodes 18 usually located at the edge nodes of the network. These servers are located close to the end users. The caching logic in the system will decide a subset of the content to be stored in the cache nodes 18 based on aspects like content popularity, business logic etc.

When end users ask for such content which is available at the edge nodes 18, the caching logic will redirect the user to the cache nodes 18 instead of fetching it from the content provider site. The caching logic is responsible for deciding which content objects are to be stored at which cache(s) and hence will store or delete content objects at individual edge caches 18 for this purpose. Thus, the list of objects in an edge node is under constant change. If a content object is deleted, and if it is needed to be placed back in the cache, the cache node 18 or cache decision logic can always get a copy from the central repository 14 or may be one or more PoP servers 16. Thus, as long as the content is stored in the main repository 14 or PoP servers 16, any cache server can easily retrieve and store a copy of the content object. Thus depending on specific architecture, the repository part of a CDN may consist of a master repository 14 plus one or more PoP servers 16. Further, cache nodes have a maximum storage capacity and when cache nodes are filled up some decision must be made on what content to keep and what content to replace. Depending on the requirements there are numerous algorithms for selecting what to keep such as Least Recently Used (LRU), Most Recently Used (MRU) and Least Frequently Used (LFU). Thus, content with a low frequency of requests with respect to other content will be deleted from the cache node to make room for new content for which it in practice may not be a high demand.

The repository ensures that a long tail content are not lost in the system or network. Since they are not stored in the caches, the CDN system can still honor the requests for these objects by redirecting the client requests to the main repository. Thus it acts as a Long tail server for the long tail content in CDN system.

As mentioned above, there are a couple of disadvantages with a centralized main repository 14 used inmost CDN systems 10.

The present invention provides a method and node for preventing content object loss in a content distribution network without the need of a repository. The basic philosophy of this solution is to proactively manage the various copies of a content object, replicate or delete them as needed for the basic CDN function, but at the same time ensure that at least one copy always exists irrespective of the chaos (replication, migration & deletion) as part of the underlying CDN system. To ensure that a copy, e.g. a copy of the long tail content object, always exists, the solution defines the concept of ranking states and thereby the concept of non-deletable state, herein also denoted mastership. The non-deletable ranking state, is a state or attribute of a content object. If a content object has this attribute for true, it means that the CDN system defines this copy as the primary copy of the content object in the system. Thus it will not be deleted from the cache node where it is present.

Note that the logic allows more than one copy to be the primary copy, i.e. a master copy for redundancy purposes.

Figure 2:
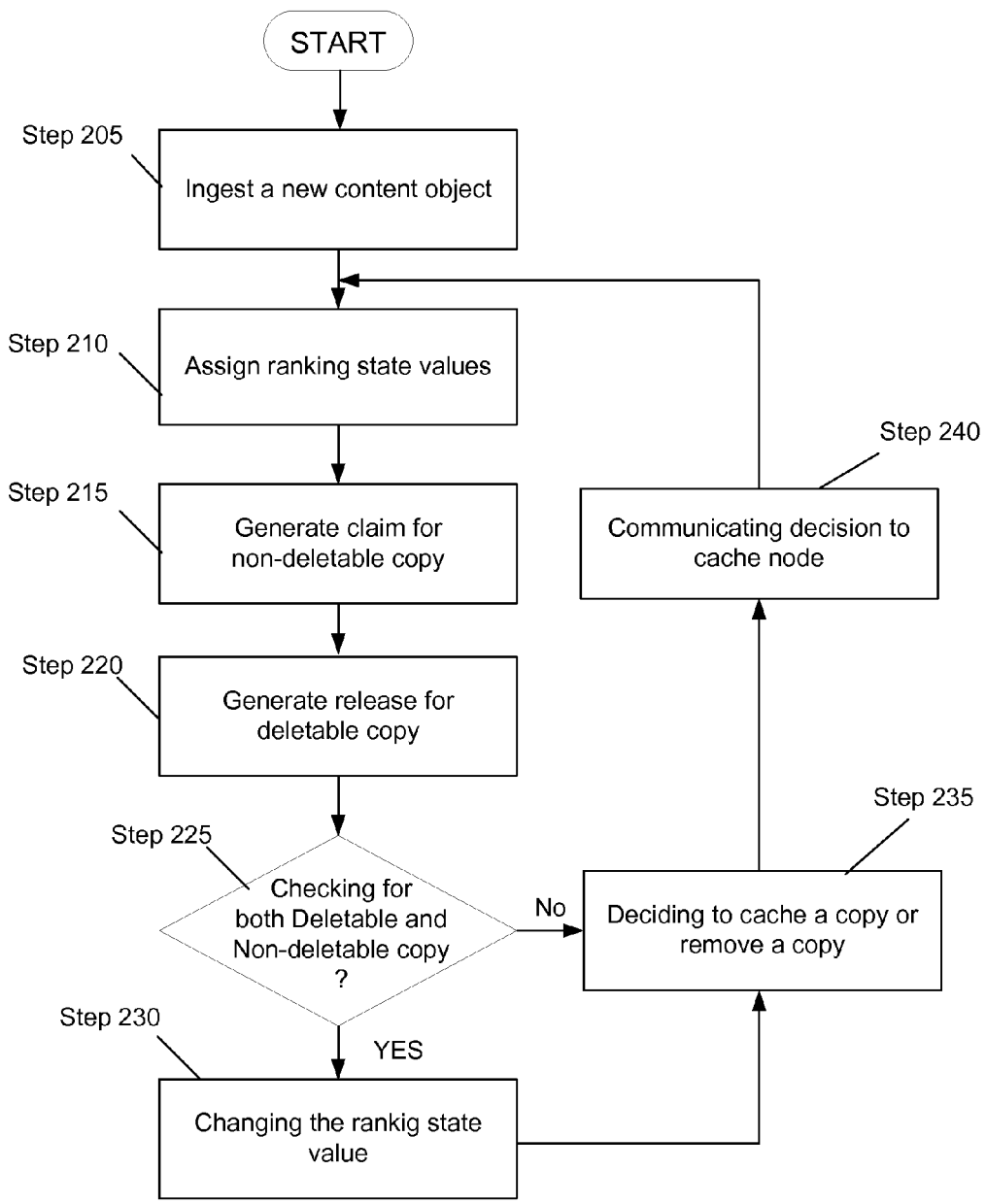
FIG. 2 is a flowchart illustrating an embodiment of the method according to the present invention.

FIG. 2 is a flowchart illustrating an embodiment of the method according to the present invention. Said method is preferably performed by and controlled in a node of a content delivery/distribution network (CDN). Said node is herein denoted as Caching Logic Node CLN, which preferably is an allocator node or a locator node, or a node having the combined allocator and locator functionalities. The present invention ensures that at least a predetermined number of copies of a content object are permanently cached/stored in a network comprising a plurality of cache nodes for storing copies of content objects.

In a first step, 205, a copy of a new content object is ingested into the network and cached in a cache node by the caching logic node. Said new content object is not for the present represented in the network. The reason for ingesting said content object may be that there are client demands, i.e. end user requests, for the content object registered by the caching logic, or that a content provider for the network introduce the content object on the provider's own initiative. The caching logic is therefore configured to cache the content object in a cache node according to condition rules, e.g. in a cache node close to where it is most frequently requested or in a cache node having a high free storage capacity for the moment.

The copies of the content object cached in cache nodes are handled and controlled from the caching logic node, which among other functionalities and processes, of which the most are not described herein, performs a continuously repeated state ranking process for all copies of the content objects cached in each cache node in the network, said process comprising steps 210-240, which starts with the step, 210, of assigning copies of content objects with a value of a ranking state, wherein the value of the ranking state is indicating whether a copy is being deletable or non-deletable, and wherein at least one copy of each content object is assigned with the value non-deletable. The ranking state of a copy corresponds to client statistics, e.g. client request frequency in the node where it is cached. An ingested copy of a new content object in the system is automatically assigned the ranking state value non-deletable, and cached in a cache node selected by the allocator functionality of the system.

In the following step, 215, a claim for non-deletable ranking state is generated for each copy having the ranking state deletable but having an end user request frequency qualifying the copy to become a candidate for the value non-deletable.

A corresponding step, 220, is also performed wherein a release message for deletable ranking state for each copy having the ranking state non-deletable but having an end user request frequency qualifying the copy to become a candidate for the value deletable, is generated. Said release messages and claim messages are sent to a checking functionality of the caching logic node. Said checking functionality will perform a checking step, 225, wherein it is checked which content objects in the network that presently have both a copy being a deletable candidate and a copy being a non-deletable candidate.

If the result of the check is positive, yes, the step of changing, 230, the value for a copy of a content object from non-deletable to deletable in one cache node, said copy being a candidate for the value deletable, is only performed if a deletable copy of said content object in another cache node being a candidate for the value non-deletable is present, and which value also then is changed, from deletable to non-deletable.

Thereafter, a deciding step, 235, is performed. In said step, it is decided, whether to cache a copy of a content object in, or delete a copy of said content object from a cache node based on its present copy value, and which decision is communicated, 240, to the cache node for execution wherein said copy is cached.

If the result of the check is negative, no, the step, 230, of changing the value for a copy of a content object from deletable to non-deletable in one cache node, said copy being a candidate for the value non-deletable is not performed. Instead, the deciding step, 235, and communication step, 240, are performed.

These steps, 210-240, of the state ranking process ensures that at least a number of copies of the same content object are permanently cached in the network. Said predetermined number may be selected and set individually for each item of a content object, i.e. for some content objects the predetermined number is "1", other content objects have the predetermined number "2", and so on. The predetermined number may also be common for all content objects in the network, e.g. there will never be less than "3" copies of any content object in the ranking state non-deletable, if the predetermined number is set to "3". The caching logic node is configured to continuously or repeatedly handle the number of copies of each content object cached in the network system and manage in which cache nodes said copies should be stored due to distribution condition rules. Said distribution rules is defined according to the caching policy of the network. Further, the caching logic is able to select which copy or copies in the ranking state deletable that are candidates to be assigned to the ranking state non-deletable, and which copy or copies in the ranking state non-deletable that are candidates to be assigned to the ranking state value deletable. As the caching logic node has all the available information stored and continuously updated regarding all the cached copies of all the content objects in the network, the caching logic is capable of selecting said candidates due to end user demand frequency and/or other criteria, such as regional statistics.

The changing step comprises a condition that has to be fulfilled if one non-deletable candidate shall be changed to the ranking state deletable. The condition is that there should be a corresponding content object copy in the deletable ranking state being a selected non-deletable candidate. Therefore, the ranking state process comprises a checking step in which it is checked which content objects in the network that presently have both a deletable candidate and non-deletable candidate. A change of ranking states will therefore only be performed if the condition is fulfilled, i.e. the same content object have a deletable candidate and a non-deletable candidate constituting a matching pair.

It should be noted, that a copy in a cache node is only momentarily a candidate, and if the condition changes, e.g. a change of client request frequency, the caching logic may decide to remove the copies candidature for a ranking state change.

In further one embodiment of the present invention, the ranking states deletable and non-deletable are divided into a number of sub-states, herein even denoted as sub-values e.g. winner, competitor, passive, etc. Said sub-values define additional ranking states in which a copy of a content object may exist due to different conditions, such as the number of end user requests during a time period compared to other copies of the same content object stored in other cache nodes in the network, or if the age out time period for which a copy is not requested is exceed, etc. Therefore, the assigning step may comprise the steps assigning each copy of content object with a value, said value is depending on the end user request level for the copy of the content object in the cache node where it is stored; and the step of deciding to cache a copy content object in, or delete a copy of said content object from a cache node based on the assigned copy value.

Figure 3:
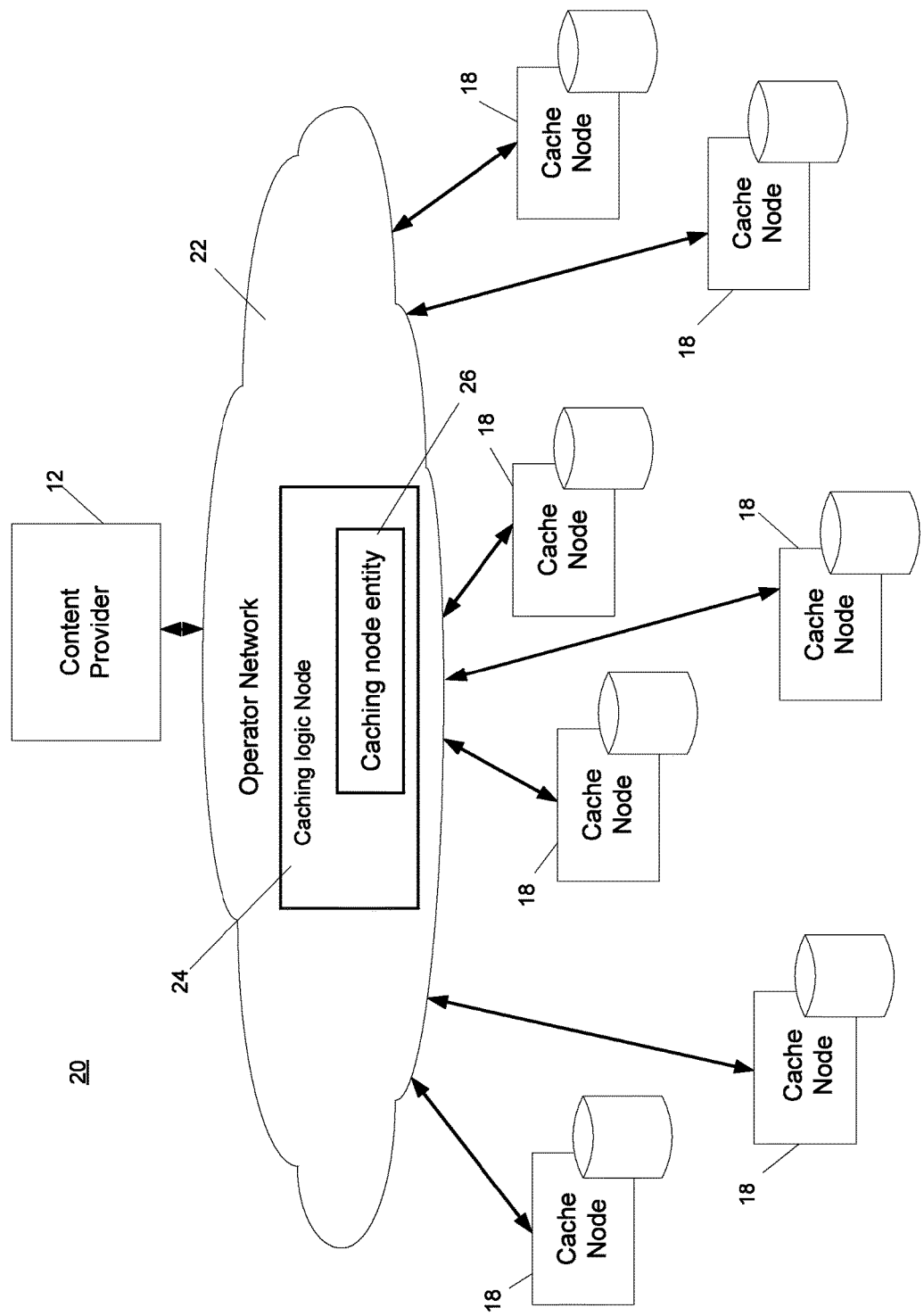
FIG. 3 is a block diagram schematically illustrating an exemplary CDN architecture comprising a node, in which the method according to the present invention is implemented.

FIG. 3 is a schematic illustration of an exemplary CDN architecture comprising a node, in which the above described method according to the present invention is implemented. Said node will control the network to operate in accordance with any embodiment of said method.

The CDN 20 illustrated in FIG. 3 is a network comprising a content provider 12 connected to an operator network 22 in which a plurality of cache nodes and a caching logic node 24 that is located for controlling the caching activity of content objects in the network 20. Said caching logic node 24 is able to communicate with the end users (not shown) connected to the different cache nodes 18 and the cache nodes via the network 22. The caching logic node is comprising caching node entity 26, which provides the functionality making a repository (14 in FIG. 1) superfluous. Said caching logic node 24 will now be described with reference to FIG. 4.

Figure 4:
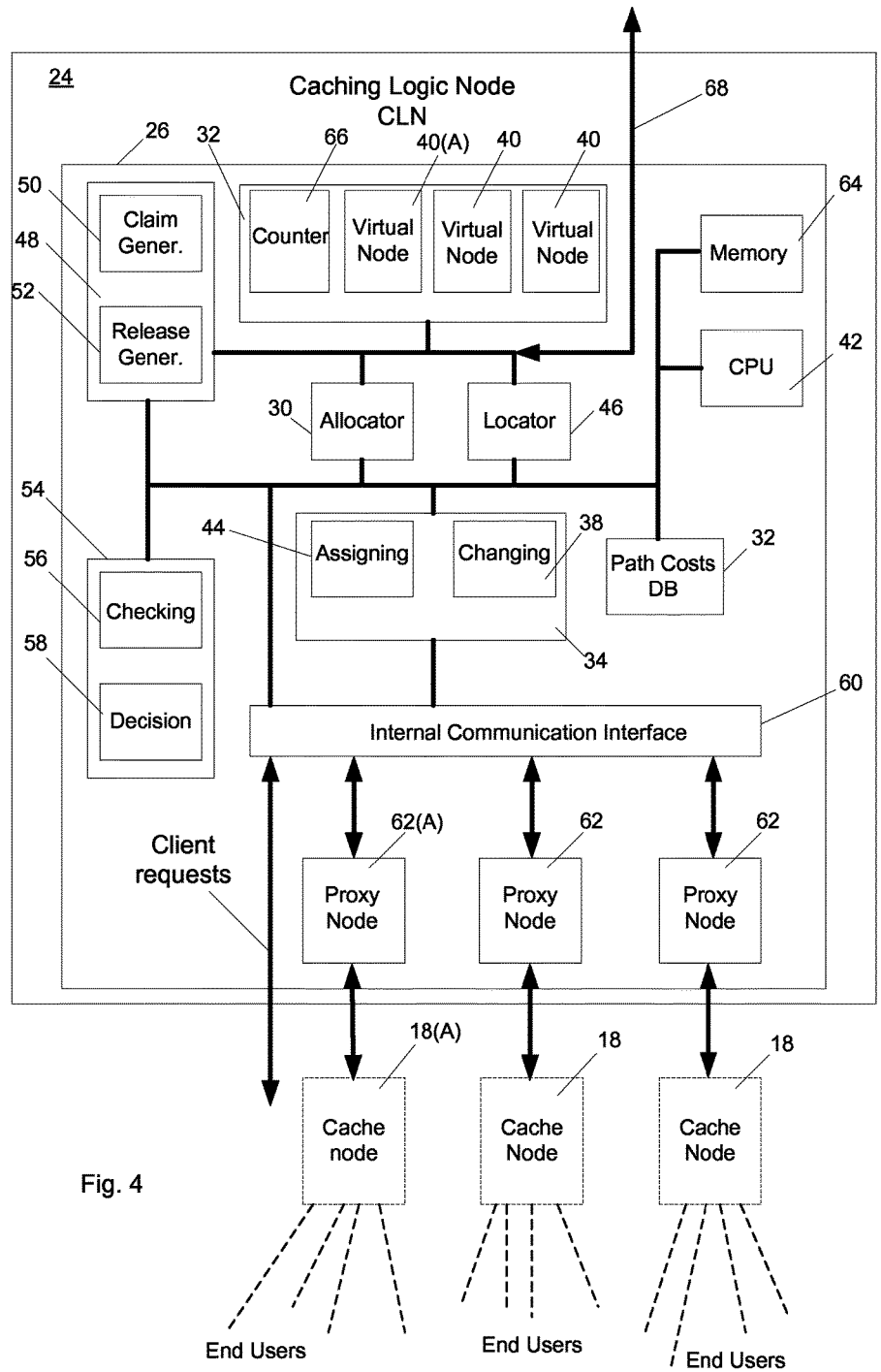
FIG. 4 is a block diagram schematically illustrating an embodiment of a caching node entity according to the present invention.

FIG. 4 is a schematic illustration of an embodiment of a caching node entity 26 according to the present invention. Said entity 26 is located in caching logic node 24 of a content delivery/distribution network 20 (CDN). Said node 24 is herein denoted caching logic node CLN, which may be an allocator node or a locator node, or a node having the combined allocator and locator functionalities. The caching node 24 entity is therefore provided with a block 30 having allocator functionality, and a block 46 providing locator functionality. The caching logic entity 26 is providing the functionality for ensuring at least a predetermined number of a content object to be kept stored in said network. Said node 24 will provide the same functions and services as described for a traditional network 10 earlier described.

The allocator functionality of the allocator block 30 is handling and responsible for storing new content or migrating content from one cache node to another based on input data, e.g. path costs, cache contents, load, etc. Said input data is retrieved from different databases, either within or outside the node 24. Path costs is accessed from a Path costs database 32, cache contents is accessed from a Cache contents database 34 and load is accessed from a user statistics database 36.

The locator functionality provided by the locator block 38 is handling and is responsible to redirecting the client to the best cache based on input data, e.g. path cost from the Path costs database 32, cache contents from Cache contents database 34 and load from user statistics database 36.

The Path costs database 32 is a database storing the network costs, i.e. retrieving cost for retrieving one copy of a content object from one point of the network to another.

The Cache contents database 34 keeps the details of the number of contents of each cache, and their ranking state and free space etc.

User requests statistics is stored in the User statistics database 36 for keeping track of all the user statistics for each content. Said database may use a counter 66 for counting all content request inputs received from all nodes for continuously updating the user request frequency for each content object. The User statistics database 36 may be combined with the Cache contents database in one common database. Said statistics may be represented as a set of virtual nodes 40. The virtual nodes 40 are logically representing the content of one or a set of cache nodes 18. A virtual node is a logical list for storing number of requests, states, priority in the cache etc., which will be described in connection to FIG. 5 of this description.

FIG. 5 illustrates an example of what entries for a virtual node 40(A) in a User statistics database 36 may look like. In this version, the virtual node 40(A) includes entries for the cache node 18(A). The content that is cached in said node is e.g. the number of requests received in this content, and the ranking states of the content. Preferably information regarding the lowest cost for retrieving the content from other cache nodes is also included for each content. Preferably, the same information is kept for content that is not cached in the node, but for which content requests have been received.

Now back to FIG. 4, the processor or a central processing unit 42 is included for, among other things, determining, based on statistics gathered from all cache nodes 18 represented in the virtual nodes 40 and the described databases 32, 34, 36, whether specific content is to be cached in a cache and noted in a corresponding virtual node, or not.

The architecture of CDN 20 has the ability to collect information from the entire network in said node 24. Specifically the caching logic node 24 having both allocator and locator functionality, i.e. having responsible for redirecting clients to the appropriate caches (cache nodes), and collecting statistics about the user requests it is receiving about particular contents. It uses this information to decide which the best content to be cached at a given cache node is, or vice versa, the best cache node to cache a particular content. This may be done periodically given the whole set of content that are served by the cache node. One artefact of this design is that caching logic node has a global picture of all the requests for a particular content. This enables it to capture demand for a particular piece of content and said node's functionality to use this information in its caching decisions and thus possibly reduce core traffic and thus save communication costs. The caching logic node may be configured to propose cache nodes to cache content even though there is no relative local demand for it.

The entity 26 may further be provided with a number of means for performing the method according to the invention. Said means for implementing said method will now be described and discussed. Said means are controlled by the processor or a central processing unit (CPU) 42, and the means are configured to exchange information, signaling and messages, with each other, other functionality blocks, e.g. the locator and allocator, of the entity and the processor. All or some of said means and functionality blocks may be implemented as computer program software comprising instructions that are executable in a programmable system, such as the CPU stored and in a memory 64 to which the CPU has access. Said CPU 42 has also access to the above described databases 32, 34, 36. The computer implementation will be discussed further down in this description.

The entity 26 comprises assigning means 44 adapted to assign copies of content objects with one value of a ranking state, wherein the value of the ranking state is indicating whether a copy is being deletable or non-deletable, and wherein at least one copy of each content object is assigned with the value non-deletable. The assigning means 44 is further configured to assign each copy of content object with a value, e.g. a sub-value of a ranking state, said value, or sub-value, is depending on the end user request frequency for the copy of the content object in the cache node where it is stored.

The assigning means 44 may further configured to assign each copy of content objects with a sub-value, said sub-value is depending on the end user request frequency for the copy of the content object in the cache node 18 where it is stored. The sub-value information is therefore updated in the corresponding entry in one of the virtual nodes.

Thus, when the assigning means 44 assigns copies of content objects with ranking state values, wherein the value of the ranking state is indicating whether a copy is being deletable or non-deletable and/or a sub-value, said assignments are performed in the stored information of the Cache contents database 34 that keeps the details of the number of contents of each cache, and their ranking state and free space etc., and in the entries of the corresponding virtual nodes 40 to the cache nodes where the copies are cached.

Further, the entity 26 may comprise changing means 46 configured to change the value for a copy of a content object from non-deletable to deletable in one cache node, said copy being a candidate for the value deletable, only if a deletable copy of said content object in another cache node is a candidate for the value non-deletable. Said changes are performed in the stored information of the Cache contents database 34 that keeps the details of the number of contents of each cache, and their ranking state and free space etc., and in the entries of the corresponding virtual nodes 40 to the cache nodes where the copies are cached.

The assigning means 44 and changing means 46 are illustrated in the Cache contents database 34 as they are operating on the mentioned information in said database.

The node entity 26 may also comprise transfer message generator 48 comprising a claim generator 50 configured to generate a claim message for a non-deletable ranking state for a copy having the ranking state deletable, but having an end user request frequency qualifying the copy to become a candidate for the value non-deletable. Said claim is sent by the claim generator 50 to a checking logic 56, and it carries necessary information, e.g. identification information and where it is cached.

Said transfer message generator 48 is further equipped with a release generator 52 configured to generate a release message for deletable ranking state for a copy having the ranking state non-deletable, but having an end user request frequency qualifying the copy to become a candidate for the value deletable. Said release message is sent to said checking logic means 56, and it comprises necessary information, e.g. identification information and where it is cached.

Said checking logic 56 is a functionality block of a Mastership Manager Logic (MML) block 54, which also is comprising a deciding means 58.

Said checking logic means 56 is configured to receive all generated claim and release messages regarding stored copies to check which of the content objects in the network 20 that presently have a matching pair of copies, i.e. both a copy being a deletable candidate and a copy being a non-deletable candidate. The checking logic 56 is configured to provide a change message comprising each matching pair of copies, identifying each copy and where it is cached, for each positive check to the changing means 46 and the deciding means 58. Each matching pair generates a positive check result. The check result is negative for a candidate copy, if the checking logic has not received a matching candidate copy of the same content object, and a switch of ranking state is therefore not possible.

Thus, client requests is forwarded to the locator 46, the locator redirects them to the best cache and updates counters 66. Then based on this info, said locator 46 updates the virtual nodes 40 by changing the ranking sub-states of copies, e.g. competitor to winner etc. The changed object is registered by the transfer message generator 48 which can raise claim or release (based on the change of state). The MML 54 is configured to decide and update ranking state of copies with non deletable or deletable.

The deciding means 42 is configured to decide whether to cache a copy of a content object in, or delete a copy of said content object from a cache node based on the present copy value and to communicate the decision by means of a communication interface 60 to the cache node wherein said copy is cached. The cache node receiving a decision is configured to execute the received decision.

The caching logic node 24 is preferably comprising a communication interface 60 for handling internal communication in the network 20, e.g. receiving content requests from cache nodes 18 and clients in the network. The communication interface 60 is further configured to cause the requested content to be cached in a cache node by e.g. sending a proposal to the cache node. It is also configured to handle the communication with end users and cache nodes.

The node entity 26 may also comprise a number of proxy nodes 62, which are responsible for external communication with real caches, error handling, retry etc. There may be a one to one mapping from proxy node 62(A) to a virtual node 40(A) but they are doing different things. Said proxies may be implemented as part of software and hardware, especially for signaling purposes.

The caching logic node 24 is preferably comprising capability, e.g. by means of the CPU 42 and a suitable interface 68, to communicate with a content provider 12 and other caching logic nodes via messages and signaling communications.

The caching node entity 26 is a natural place for adding a lot of additional logic once the basic network system is operational. The node entity may also be adapted to ensure a fair spread of long tail content assets among the cache nodes. It may also incorporate history and ageing mechanisms to avoid master oscillations. The entity may also collect data mining to see how content is used in the network system.

The invention may be implemented in digital electronically circuitry, or in computer hardware, firmware, software, or in combinations of them. Apparatus of the invention may be implemented in a computer program product tangibly embodied in a machine readable storage device for execution by a programmable processor; and method steps of the invention may be performed by a programmable processor executing a program of instructions to perform functions of the invention by operating on input data and generating output.

The invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language.

Generally, a processor will receive instructions and data from a read-only memory and/or a random access memory. Storage devices, such as memory 64 if FIG. 4, suitable for tangibly embodying computer program instructions and data include all forms of non-volatile memory, including by way of example semiconductor memory devices, such as EPROM, EEPROM, and flash memory devices; magnetic disks such internal hard disks and removable disks; magneto-optical disks; and CD-ROM disks. Any of the foregoing may be supplemented by, or incorporated in, specially-designed ASICs (Application Specific Integrated Circuits).

Figure 6:
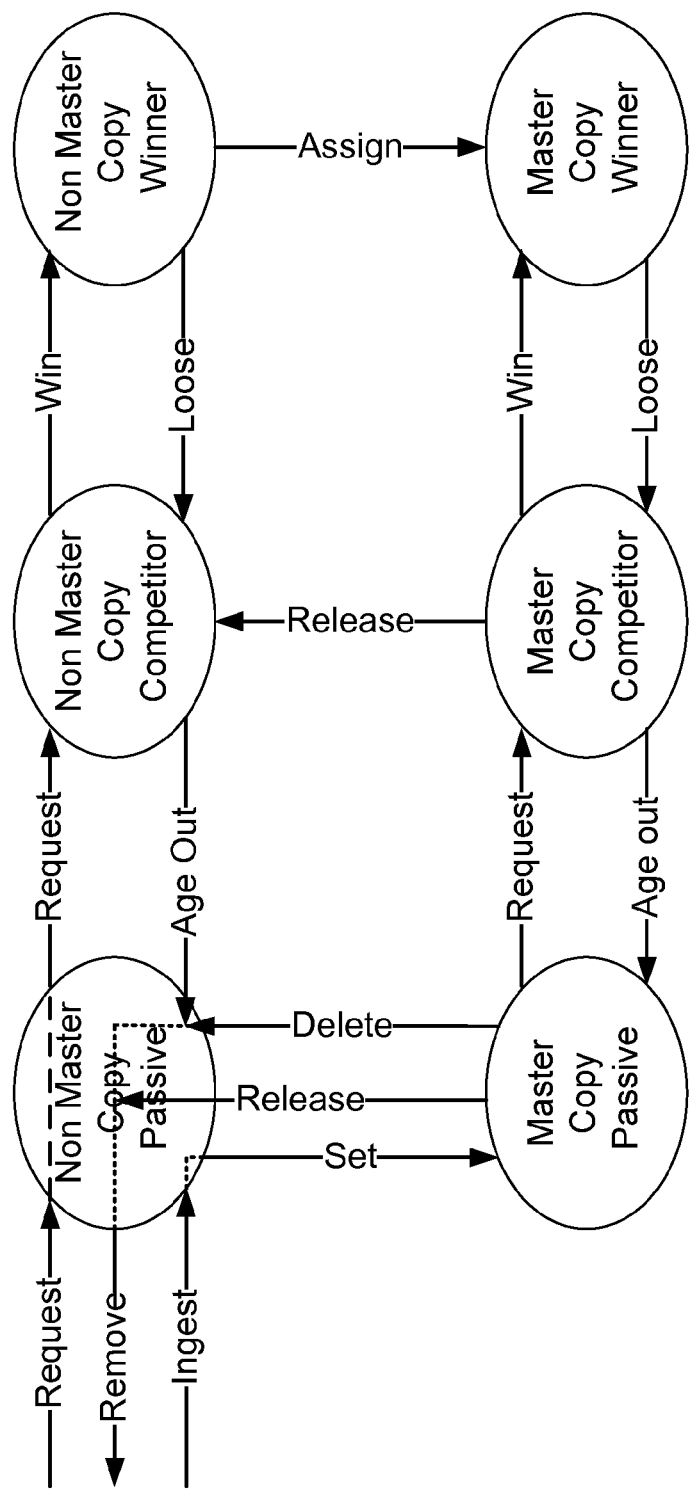
FIG. 6 is a diagram illustrating an example of different ranking state values and possible state transitions for copies of content objects in accordance with the present invention.

With reference to FIG. 6, an example of additional ranking state values and possible state transitions for copies of content objects will be described. By way of the following example, the functionality of the present invention may be better understood.

The copy of a content object can be in any of the various states according to the following example. Said configuration has two ranking states, master and non master. The master state corresponds to the ranking state non-deletable and the non-master state corresponds to the ranking state deletable. When a copy of a content object is in the master state, it means that it is designated as a primary copy of the network and hence there should not be deleted. When a copy is in the Non-master state, any copy of the object, which is not a master, is in the non master state, i.e. deletable. This means that this copy can be deleted if the caching logic entity according to the invention decides to do so.

Within said higher states, i.e. either in the master or non-master, three different sub-states are possible, as described above. The sub-states may be as follows: winner, competitor and passive. Together the higher level states and the sub-states define different ranking state values:

Winner: The content object has been designated by the caching logic to be cached in the cache node. This is because there exists a high demand for such a content object at the caching site compared to other nodes. Thus, the content object has won among the potential content objects which could have been cached. A copy of a content object being in the sub-state winner implies that a copy of said content object is already present at the cache node. Hence, A non master copy winner is in this state as there exists a demand for such a content object at the caching site;

A master copy winner is in a ranking state where it is non-deletable.

Competitor: Either master copy competitor or non master copy competitor.

Non master copy competitor is a state wherein a content object which is requested at a caching site, but not cached there because of low number end user demands, i.e. low request level, is in the competitor state. If a competitor gets enough requests, it would be cached and change its state to a winner;

Master copy competitor is a state wherein a copy of a content object already has been designated by the caching logic to be cached in the cache node storage.

Passive: Passive is a state used for a copy when there has not been requests for the content object at a caching site for a period.

Non master copy passive is considered as an imaginary state indicating that the content object is non-existing in the network;

Master copy passive state is a state wherein a content object is ingested into the system, the copy of said content object might be initially placed in a caching site where there is no request for it. A master copy that is aged out, i.e. there has not been any end user requests for it during a longer period, may also be placed in this state. A content provider may also decide to manually remove a content object from a cache node and/or the network, as illustrated in the drawing by the delete arrow.

A number of possible state transitions are indicated by arrows in the drawing. Some of the transitions between two states within a ranking state are considered to define a transition loop. The assign and release transitions between deletable and non-deletable states have already been described above in relation to different embodiments of invention. A copy in a storage node may therefore be switched between said states due to the user requests both in a node level and a network level. The caching logic is therefore configured to collect the end user requests and handle said request information for a content object both for each node, individually i.e. on the node level, and on the network level, e.g. by comparing the number of end user requests for a certain content object in different storage nodes and thereby enabling the decision which copy (and thereby implicitly a node) is a winner or competitor.

A copy of a content object in a cache node may therefore be switched between the competitor state and winner state due to the number of requests.

The Non Master Copy Passive is an imaginary state indicating that the content object is non-existing in the network. A non existing content object may be ingested and set in a storage node where it is resting for user requests. Such a copy, which may be the only copy of the content object in the network, is set as Master Copy Passive. If any content object which is requested at a caching site, but not cached as a copy because of low number end user demands, i.e. low request level, is in a Non Master Copy Competitor. If a competitor gets enough requests, it would be cached in said caching site (cache node) and change its state to a winner. The new copy is a replica from a corresponding content object stored in another node storage in the network. This is a called a win transition, indicated by an arrow in the drawing from non master copy competitor to a non master copy winner. A copy of a content object will be cached in the caching site wherein a number of end user requests exceeds a pre-set threshold level and set in a Non Master Copy winner state.

As a non master copy winner, the copy is a candidate for a non-deletable state, i.e. to be elected as Master copy winner. A request for mastership will periodically be generated by the caching logic as long as the copy is dedicated to this state. If a request for mastership from said copy is accepted by the mastership manager logic, MML, said logic will assign (the transition is indicated by an assign arrow) said copy to the Master copy winner state. As being set in this state, the copy is also in a ranking state wherein the copy is non-deletable. As stated above, a content object which has no physical copy stored anywhere in the network is ingested in a suitable node storage Master Copy passive, resting for end users requests to be registered in the network. When the number of end users requests increases over a predefined threshold value, the caching logic designates the copy a master copy competitor. If the number of end user requests increases over a time period to an amount exceeding another threshold value, said other node storages, respectively in their node storages, each of said node will be designated as master copy winner. More than one copy in a network may therefore be in said master copy winner state. Each copy could be elected as master copy winner. Hence, if the number of end user requests exceeds the said threshold value for each one of other copies stored in the winner state.

However, if instead the number of requests for said copy decreases under the threshold value, the copy will loose it's winner state and will be dedicated to the Non Master Copy Competitor. The stored copy of the content object will be deleted during the loose transition from winner to non master copy competitor.

A transition is illustrated in FIG. 6 between states due to age out, i.e. there is no end user demands for the content object in the node for a time period that exceed a predefined age out period in the system. In accordance with the invention this transition is possible if a copy or content object being in one of the two competitor states. The new state will then be passive state. However, if the end user requests exceed over a predefined threshold, the content object is changed to a competitor state.

The above described caching node entity according to the invention has a Mastership Manager logic (MML) 54, as illustrated in FIG. 4. In accordance with the above used terms master, corresponding to non-deletable, and non-master, corresponding to deletable, the condition for changing values of copies of the same content object, which copies are stored in different cache nodes in the system may then be defined as:

A mastership request, i.e. claim, from a non master copy of a content object stored in one cache node will be accepted and performed if at the same time or within a pre-set time period a mastership release request from another copy of the same content object stored in another storage node is present in the MML;

A mastership release request from a master copy of a content object stored in one cache node will be accepted and performed if in the MML, at the same time or within a pre-set time period, a mastership release request from a copy of the same content object stored in another cache node is present.

A mastership request is generated whenever a copy of a content object is cached at a content site, it becomes a non master winner; and a request for mastership, i.e. to be granted mastership, will be handled by the MML for said copy; and a release mastership message is generated whenever the end user requests for a master copy of a content object stored in a cache node falls below a pre-set relative threshold level, below which it cannot be cached because of its own merit, i.e. the number of user demands and for it, the locator will send a request for said copy to be released from mastership. Of redundancy and security reasons a copy will not be deleted until the mastership is transferred.

The mastership manager logic will process all the claim and release messages, and will process them to elect a master. Based on this information it may also decide to transfer mastership to a better place. This might be for example when a master winner has become master competitor or master passive. Then the mastership manager will transfer the mastership to a non master winner. This will enable the old master's space to be recovered by the system as well allowing the new master copy to migrate to a place where it can service user requests.

The mastership request corresponds to the claim for non-deletable ranking state and a release mastership message corresponds to the release message for deletable ranking state, in accordance with the description of the method illustrated in FIG. 3 above.

The present invention provides a number of advantages over prior art systems for caching/distributing content in a network.

One advantage is that the present invention overcomes the problem of "Single point of failure": Since all the long tail content is distributed in the network cache nodes and not stored in one single place.

The present invention does also provide a very fast, effective and secure method for handling all the millions of content object transfers, e.g. replication, migration and deletion of copies, occurring in every moment in a huge CDN comprising hundred of cache nodes.

Further one advantage is that the present invention overcomes the bandwidth and connectivity issues in CDN architecture comprising a central repository. Even though the number of requests for each of the long tail content objects is low, the total number of requests for objects in the long tail is quite high. This translates to a high connectivity and bandwidth requirements at the central repository. Also the fact that content replication also uses the central repository adds on to this bandwidth. These requests have to consistently pass to the core network adding to the bottleneck at the core. A CDN system wherein the present invention is implemented, a central repository is not needed, and the communication capacity of the core will increase.

A number of embodiments of the present invention have been described. It will be understood that various modifications may be made without departing from the scope of the invention. Therefore, other implementations are within the scope of the following claims defining the invention.

The invention claimed is:

1. A non-transitory computer readable medium storing instructions that, when executed by a processor, cause the processor to carry out a method for ensuring that at least a predetermined number of copies of a content object are kept stored in a network comprising a plurality of cache nodes for storing copies of content objects, the method comprising:
   assigning each of a plurality of copies of content objects a value of a ranking state, wherein the value of the ranking state indicates whether the copy is deletable or non-deletable, and wherein at least one copy of each content object is assigned with the value non-deletable;
   changing the ranking state value for at least one copy of at least one content object from non-deletable to deletable in a cache node, said at least one copy being eligible for the value deletable only if a deletable copy of said at least one content object in another cache node is eligible for the value non-deletable.

2. The non-transitory computer readable medium according to claim 1, wherein the method further comprises:
   generating a claim for non-deletable ranking state for each copy having the ranking state deletable but having an end user request frequency qualifying the copy to become eligible for the value non-deletable.

3. The non-transitory computer readable medium according to claim 1, wherein the method further comprises:
   generating a release message for deletable ranking state for each copy having the ranking state non-deletable but having an end user request frequency qualifying the copy to become eligible for the value deletable.

4. The non-transitory computer readable medium according to claim 1, wherein the method further comprises:
   checking which content objects in the network that presently have both at least one copy being eligible for the value deletable and at least one copy being eligible for the value non-deletable.

5. The non-transitory computer readable medium according to claim 1, wherein the assigning step further comprises:

assigning each copy of content object with a value, said value depending on the end user request frequency for the copy of the content object stored in the cache node.

6. The non-transitory computer readable medium according to claim 1, wherein the method further comprises:
deciding, for each of the content objects, to cache a copy of said content object in, or delete a copy of said content object from a cache node based on the ranking state value of said content object;
communicating the decision to the cache node wherein said copy is cached.

7. A caching node entity for ensuring that at least a predetermined number of copies of a content object are kept stored in a network comprising a plurality of cache nodes for storing copies of content objects, the entity comprising:
a processor;
a memory containing instructions that, when executed by the processor, cause the caching node entity to:
assign each of a plurality of copies of content objects a value of a ranking state, wherein the value of the ranking state indicates whether the copy is deletable or non-deletable, and wherein at least one copy of each content object is assigned with the value non-deletable;
change the ranking state value for at least one copy of at least one content object from non-deletable to deletable in a cache node, said at least one copy being eligible for the value deletable only if a deletable copy of said at least one content object in another cache node is eligible for the value non-deletable.

8. The node entity according to claim 7, wherein the instructions contained in the memory further contain checking instructions that cause the caching node entity to check which content objects in the network presently have both at least one copy eligible for the value deletable and at least one copy eligible for the value non-deletable.

9. The node entity according to claim 8, wherein the instructions contained in the memory further cause the caching node entity to:
generate a claim for a non-deletable ranking state for each copy having the ranking state deletable but having an end user request frequency qualifying the copy to become eligible for the value non-deletable; and
carry out the checking instructions for at least one copy for which the claim is generated.

10. The node entity according to claim 8, wherein the instructions contained in the memory further cause the caching node entity to:
generate a release message for a deletable ranking state for each copy having the ranking state non-deletable but having an end user request frequency qualifying the copy to become eligible for the value deletable; and
carry out the checking instructions for at least one copy for which the release message is generated.

11. The node entity according to claim 7, wherein the instructions contained in the memory further cause the caching node entity to assign, for at least one of the content objects, each copy of at least one of the content objects with a value, said value depending on the end user request frequency for the copy of the at least one content object in the cache node where the copy of the at least one content object is stored.

12. The node entity according to claim 7, wherein the instructions contained in the memory further cause the caching node entity to decide, for each of the content objects, whether to cache a copy of said content object in, or delete a copy of said content object from a cache node based on the ranking state value of said content object and a transmitting device for communicating the decision to the cache node in which said copy is cached.

13. A system for ensuring that at least a predetermined number of copies of a content object are kept stored in a network, the system comprising:
a plurality of caching nodes configured to cache copies of content objects; and
a caching logic node configured to control caching activity in the plurality of caching nodes, the caching logic node comprising:
a processor;
a memory containing instructions that, when executed by the processor, cause the caching logic node to:
assign each of a plurality of copies of content objects cached in the caching nodes a value of a ranking state, wherein the value of the ranking state indicates whether the copy is deletable or non-deletable, and wherein at least one copy of each content object is assigned with the value non-deletable;
change the ranking state value for at least one copy of at least one content object from non-deletable to deletable in at least one of the cache nodes, said at least one copy being eligible for the value deletable only if a deletable copy of said at least one content object in another at least one of the cache nodes is eligible for the value non-deletable.

14. The system according to claim 13, wherein the instructions contained in the memory further include checking instructions that cause the caching logic node to check which content objects in the network presently have both at least one copy eligible for the value deletable and at least one copy eligible for the value non-deletable.

15. The system according to claim 14, wherein the instructions contained in the memory further cause the caching logic node to:
generate a claim for a non-deletable ranking state for each copy having the ranking state deletable but having an end user request frequency qualifying the copy to become eligible for the value non-deletable; and
carry out the checking instructions for at least one copy for which the claim is generated.

16. The system according to claim 14, wherein the instructions contained in the memory further cause the caching logic node to:
generate a release message for a deletable ranking state for each copy having the ranking state non-deletable but having an end user request frequency qualifying the copy to become eligible for the value deletable; and
carry out the checking instructions for at least one copy for which the release message is generated.

17. The system according to claim 13, wherein the instructions contained in the memory further cause the caching logic node to assign, for at least one of the content objects, each copy of at least one of the content objects with a value, said value depending on the end user request frequency for the copy of the at least one content object in the cache node where the copy of the at least one content object is stored.

18. The system according to claim 13, wherein the instructions contained in the memory further cause the caching logic node to:
decide, for each of the content objects, whether to cache a copy of said content object in, or delete a copy of said content object from at least one of the cache nodes based on the ranking state value of said content object; and transmit the decision to the at least one of the cache nodes in which said copy is cached.

\* \* \* \* \*